US010184854B2

(12) United States Patent
Tanabe et al.

(10) Patent No.: US 10,184,854 B2
(45) Date of Patent: Jan. 22, 2019

(54) MOBILE DEVICE AND CONTROL METHOD FOR POSITION CORRELATION UTILIZING TIME-BASED ATMOSPHERIC PRESSURE MEASUREMENTS

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP); Shinya Saito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/271,233

(22) Filed: Sep. 21, 2016

(65) Prior Publication Data

US 2017/0089791 A1    Mar. 30, 2017

(30) Foreign Application Priority Data

Sep. 28, 2015 (JP) .................................. 2015-190440

(51) Int. Cl.
*G01L 19/00* (2006.01)
*G01L 13/00* (2006.01)
(Continued)

(52) U.S. Cl.
CPC ............ *G01L 19/0092* (2013.01); *G01C 5/06* (2013.01); *G01C 21/165* (2013.01); *G01L 13/00* (2013.01);
(Continued)

(58) Field of Classification Search
CPC ....... G01L 19/0092; G01L 13/62; G01C 5/06; G01C 21/165; G01P 3/02; H04W 4/027; H04W 4/046; H04W 88/02
(Continued)

(56) References Cited

U.S. PATENT DOCUMENTS 9,398,536 B2 * 7/2016 Czompo ........... H04W 52/0254
2007/0072158 A1   3/2007 Unuma et al.
(Continued)

FOREIGN PATENT DOCUMENTS

EP    2988094 A1     2/2016
JP    2007-93433 A   4/2007
(Continued)

OTHER PUBLICATIONS

Translation JP 2013170944 A Sep. 2, 2013.*
(Continued)

*Primary Examiner* — Natalie Huls
*Assistant Examiner* — Monica S Young
(74) *Attorney, Agent, or Firm* — Hauptman Ham, LLP

(57) ABSTRACT

A mobile device comprises an atmospheric pressure sensor configured to acquire a value of atmospheric pressure acting on the mobile device, an acceleration sensor configured to acquire a value of acceleration acting on the mobile device, and at least one controller configured to determine a moving state of the mobile device based on the value of atmospheric pressure and the value of acceleration, wherein the at least one controller is configured to determine the moving state of the mobile device based on the value of atmospheric pressure when the value of atmospheric pressure changed per an unit interval is equal to or greater than a threshold value, under the determination result which has been acquired based on the value of acceleration and indicates that the mobile device is not in movement.

3 Claims, 3 Drawing Sheets

(51) Int. Cl.
  *G01P 13/02* (2006.01)
  *G01C 5/06* (2006.01)
  *G01C 21/16* (2006.01)
  *G01P 3/62* (2006.01)
  *H04W 4/02* (2018.01)
  *H04W 4/04* (2009.01)
  *H04W 88/02* (2009.01)

(52) U.S. Cl.
  CPC ............... *G01P 3/62* (2013.01); *G01P 13/02* (2013.01); *H04W 4/027* (2013.01); *H04W 4/046* (2013.01); *H04W 88/02* (2013.01)

(58) Field of Classification Search
  USPC .......................................................... 73/509
  See application file for complete search history.

(56) References Cited

U.S. PATENT DOCUMENTS

| | | | |
|---|---|---|---|
| 2007/0218823 A1* | 9/2007 | Wolf | G01C 5/06 454/72 |
| 2016/0091309 A1* | 3/2016 | Sasaki | G01C 5/06 73/384 |
| 2017/0010174 A1* | 1/2017 | Melen | B62D 15/025 |

FOREIGN PATENT DOCUMENTS

| | | |
|---|---|---|
| JP | 2009-267770 A | 11/2009 |
| JP | 2012-237719 A | 12/2012 |
| JP | 2013170944 A * | 9/2013 |
| WO | 2014/192271 A1 | 12/2014 |
| WO | 2015/098706 A1 | 7/2015 |

OTHER PUBLICATIONS

Office Action in JP Application No. 2015-190440, dated Nov. 1, 2016, for which an explanation of relevance is attached.

Extended European Search Report in EP Application No. 16190610.2 dated Feb. 8, 2017.

Keisuke Yoneija, et al. "Activity recognition method using pressure sensing", Research Report of Information Processing Society of Japan, Mobile Computing and Ubiquitous Communication (MBL) 2014-MBL-070 [online], Information Processing Society of Japan, Mar. 7, 2014, pp. 1-8, Internet <URL: https://ipsj.ixsq.nii.ac.jp/ej/?action=repository_action_common_download&itemid=989478,item_no=1&attribute_id=1&file_no=1>,11pp.

* cited by examiner

MOBILE DEVICE AND CONTROL METHOD FOR POSITION CORRELATION UTILIZING TIME-BASED ATMOSPHERIC PRESSURE MEASUREMENTS

CROSS-REFERENCE TO RELATED APPLICATION

The present application claims priority to and incorporates by reference the entire contents of Japanese Patent Application No. 2015-190440 filed in Japan on Sep. 28, 2015.

FIELD

The present invention relates to a mobile device, a control method, and a non-transitory storage medium.

BACKGROUND

In the related art, a mobile device that can determine whether the mobile device is in movement is known. For example, JP-A-2009-267770 discloses a technique of determining movement on a vehicle such as an electric train from a detection result of an acceleration sensor or the like.

SUMMARY

A mobile device, a control method, and a non-transitory storage medium are disclosed.

According to one aspect, there is provided a mobile device comprising: an atmospheric pressure sensor configured to acquire a value of atmospheric pressure acting on the mobile device; an acceleration sensor configured to acquire a value of acceleration acting on the mobile device; and at least one controller configured to determine a moving state of the mobile device based on the value of atmospheric pressure and the value of acceleration, wherein the at least one controller is configured to determine the moving state of the mobile device based on the value of atmospheric pressure when the value of atmospheric pressure changed per an unit interval is equal to or greater than a threshold value, under the determination result which has been acquired based on the value of acceleration and indicates that the mobile device is not in movement.

According to one aspect, there is provided a mobile device comprising: an atmospheric pressure sensor configured to acquire a value of atmospheric pressure acting on the mobile device; and at least one controller configured to determine that the mobile device is in movement on an electric train or an automobile, when the value of atmospheric pressure satisfies a predetermined condition.

According to one aspect, there is provided a control method which is performed by a mobile device including an atmospheric pressure sensor configured to acquire a value of atmospheric pressure acting on the mobile device and an acceleration sensor configured to acquire a value of acceleration acting on the mobile device, the control method comprising: determining a moving state of the mobile device based on the value of acceleration; determining whether the value of atmospheric pressure changed per an unit interval is equal to or greater than a threshold value; and determining the moving state of the mobile device regardless of the value of acceleration when the value of atmospheric pressure changed per an unit interval is equal to or greater than a threshold value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Plural embodiments of a mobile device, a control method, and a control program according to the present application will be described below in detail with reference to the accompanying drawings.

Hereinafter, a smartphone will be described as an example of a mobile electronic device, but the mobile electronic device is not limited to the smartphone. The mobile electronic device may be an electronic device other than the smartphone as long as it can be carried by a user and can determine a type of movement of the user. Examples of other device include a mobile phone, a tablet, a mobile PC, a digital camera, a media player, an electronic book reader, a navigator, a pedometer, a physical activity meter, a wearable device, a head mount display, a hearing aid, an earphone, and a game machine. Examples of the wearable device include a wristwatch type, an eyeglass type, a shoe type, a hair clip type, a key type, a necklace type, a collar type, a ring type, and a wristband type.

Figure 1:
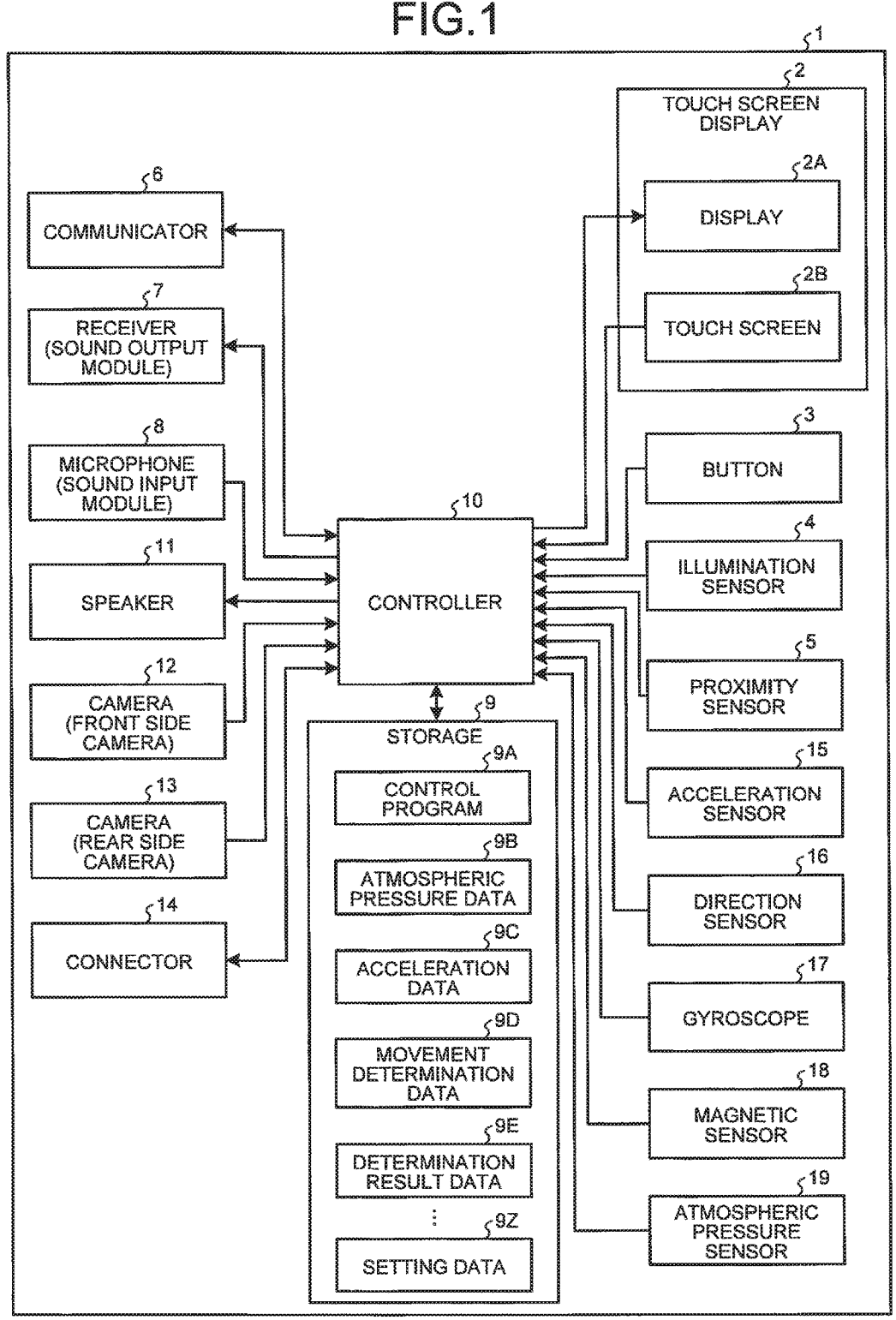
FIG. 1 is a block diagram illustrating a functional configuration of a smartphone according to an embodiment.

FIG. 1 is a block diagram illustrating a functional configuration of a smartphone 1. In the following description, similar components may be referenced by similar reference numerals. Further, the same description may not be repeated. In the following description, the smartphone 1 may be referred to as "own device."

As illustrated in FIG. 1, the smartphone 1 includes a touch screen display 2, a button 3, an illumination sensor 4, a proximity sensor 5, a communicator 6, a receiver 7, a microphone 8, a storage 9, a controller 10, a speaker 11, a camera 12, a camera 13, a connector 14, an acceleration sensor 15, a direction sensor 16, a gyroscope 17, a magnetic sensor 18, and an atmospheric pressure sensor 19.

The touch screen display 2 includes a display 2A and a touch screen 2B. The display 2A and the touch screen 2B may be located to overlap each other, may be located to be arranged in parallel, or may be located to be separated from each other. When the display 2A and the touch screen 2B are located to overlap each other, for example, one or more sides of the display 2A may not be parallel to any side of the touch screen 2B. The touch screen display 2 is an example of a display module.

The display 2A includes a display device such as a liquid crystal display (LCD), an organic electroluminescence display (OELD), or an inorganic electroluminescence display (IELD). The display 2A displays objects such as characters, images, symbols, and figures in a screen. The screen including the objects displayed by the display 2A includes a screen referred to as a lock screen, a screen referred to as a home screen, and an application screen which is displayed on executing an application. The home screen may also be referred to as a desktop, a standby screen, an idle screen, a standard screen, an application list screen, or a launcher screen.

The touch screen 2B detects a contact or an approach of a finger, a pen, a stylus pen, or the like with or to the touch screen 2B. The touch screen 2B can detect touched positions on the touch screen 2B when the plural fingers, pens, stylus pens, or the like contact with or approach to the touch screen 2B. In the following description, positions at which the plural fingers, pens, stylus pens, and the like contact with or approach to the touch screen 2B and which are detected by the touch screen 2B are referred to as "detection positions." The touch screen 2B transmits a notice of a contact or an approach of a finger with or to the touch screen 2B, along with the detection position to the controller 10. The touch screen 2B may transmit a detection position to the controller 10 as a notice of detection of a contact or an approach. The operation which can be performed by the touch screen 2B can be performed by the touch screen display 2 including the touch screen 2B. In other words, the operation which is performed by the touch screen 2B may be performed by the touch screen display 2.

The controller 10 determines a type of a gesture on the basis of at least one of a contact or an approach detected by the touch screen 2B, a detection position, a variation of the detection position, a time in which the contact or the approach continues, an interval with which the contact or the approach is detected, and the number of times of the detection of the contact. The operation which can be performed by the controller 10 can be performed by the smartphone 1 including the controller 10. In other words, the operation which is performed by the controller 10 may be performed by the smartphone 1. The gesture is an operation which is performed on the touch screen 2B using a finger. The operation performed on the touch screen 2B may be performed on the touch screen display 2 including the touch screen 2B. Examples of the gesture which is determined via the touch screen 2B by the controller 10 include a touch, a long touch, a release, a swipe, a tap, a double tap, a long tap, a drag, a flick, a pinch-in, and a pinch-out, but are not limited thereto.

A detection system of the touch screen 2B may be an arbitrary system such as a capacitance system, a resistive membrane system, a surface acoustic wave system, an infrared system, and a load detection system.

The button 3 receives an input of operation by a user. The number of buttons 3 may be one or more.

The illumination sensor 4 detects illuminance. The illuminance is a value of a light flux which is incident on a unit area of a measuring surface of the illumination sensor 4. The illumination sensor 4 is used, for example, for adjustment of luminance of the display 2A.

The proximity sensor 5 detects presence of an object positioned in proximity thereto in a contactless manner. The proximity sensor 5 detects presence of an object on the basis of a change in magnetic field, a change in return time of reflected wave of ultrasonic wave, or the like. The proximity sensor 5 detects, for example, an approach of a face of a user to the display 2A. The illumination sensor 4 and the proximity sensor 5 may be configured as a single sensor. The illumination sensor 4 may be used as a proximity sensor.

The communicator 6 can performs wireless communication. Examples of a wireless communication standard which is supported by the communicator 6 include, but are not limited to, communication standards of cellular phones such as 2G, 3G, and 4G and short-range wireless communication standards. Examples of the communication standards of cellular phones include, but are not limited to, long term evolution (LTE), wideband code division multiple access (W-CDMA), worldwide interoperability for microwave access (WiMAX (registered trademark)), CDMA 2000, personal digital cellular (PDC), global system for mobile communications (GSM (registered trademark)), and personal handy-phone system (PHS). Examples of the short-range wireless communication standard include, but are not limited to, IEEE 802.11, Bluetooth (registered trademark), infrared data association (IrDA), near field communication (NFC), and wireless personal area network (WPAN). Examples of the WPAN communication standard include, but are not limited to, ZigBee (registered trademark). The communicator 6 may support one or more of the above-mentioned communication standards.

The receiver 7 outputs a sound signal transmitted from the controller 10 as sound. The receiver 7 can output, for example, sound of a video and sound of music which is reproduced on the smartphone 1 and voice of a communication partner. The microphone 8 converts a user's voice or the like into a sound signal and transmits the sound signal to the controller 10.

The storage 9 can store programs and data. The storage 9 may be used as a work area that temporarily stores process results of the controller 10. The storage 9 may include an arbitrary non-transitory storage medium such as a semiconductor storage medium and a magnetic storage medium. The storage 9 may include a plurality of types of storage media. The storage 9 may include a combination of a storage medium, such as a memory card, an optical disc, or a magneto-optical disk, and a reading device of the storage medium. The storage 9 may include a storage device such as a random access memory (RAM) that is used as a transitory storage area.

Programs stored in the storage 9 include applications which are executed in a foreground or a background and a basic program (not illustrated) that supports operations of the applications. For example, when the applications are executed in the foreground, a screen of the application is displayed on the display 2A. Examples of the basic program include, but are not limited to, an operating system (OS). The applications and the basic program may be installed onto the storage 9 via wireless communication by the communicator 6 or via a non-transitory storage medium.

The storage 9 can store a control program 9A, atmospheric pressure data 9B, acceleration data 9C, determination data for movement 9D, determination result data 9E, and setting data 9Z.

The control program 9A provides a variety of control functions for activating the smartphone 1. In an example of embodiments, the control program 9A can provide a function of determining a moving state of a user of a smart phone on the basis of a value of atmospheric pressure and a value of acceleration. A state of being in movement and a state of not being in movement are included in the moving state.

In an example of embodiments, the control program 9A can provide a function of determining the moving state of the mobile device based on the value of atmospheric pressure, when the value of atmospheric pressure changed per an unit interval is equal to or greater than a threshold value, under the determination result which has been acquired based on the value of acceleration and indicates that the mobile device is not in movement.

In an example of embodiments, the control program 9A can provide a function of determining the moving state apart from determining the moving state based on the value of acceleration when the value of atmospheric pressure changed per an unit interval is equal to or greater than a threshold value. The unit interval may be set to a time. When the unit interval is set to a time, examples of the time include 10 minutes, 5 minutes, 2 minutes, 1 minute, 30 seconds, 15 seconds, 10 seconds, 5 seconds, 2 seconds, 1 second, 500 microseconds, 200 microseconds, and 100 microseconds, but are not limited thereto. The unit interval may be set to a detection frequency in a device that periodically detects a value. When the unit interval is set to the detection frequency, examples of the detection frequency include one time, two times, five times, and ten times, but are not limited thereto.

In an example of embodiments, the control program 9A can provide a function of determining a type of movement when the value of atmospheric pressure changed per an unit interval is equal to or greater than a threshold value and when a state in which the value of atmospheric pressure changed per an unit interval is equal to or greater than the threshold value continues for a predetermined time or more. Examples of the type of movement include a user's feet, a powered vehicle, and a vertical transportation. When the type of movement is a user's feet, the control program 9A may output walking or running as the determination result. When the type of movement is a powered vehicle, the control program 9A may output an electric train or an automobile as the determination result. When the type of movement is a vertical transportation, the control program 9A may output an elevator or an escalator as the determination result. Examples of the type of movement may include a man-powered vehicle. When the type of movement is a man-powered vehicle, the control program 9A may output a bicycle as the determination result.

In an example of embodiments, the control program 9A can provide a function of determining a moving state apart from determining the moving state based on the value of acceleration when an interval which is required for a cumulative value of change of the value of atmospheric pressure to be equal to or greater than a threshold value is equal to or less than a threshold value. The cumulative value of change of the value of atmospheric pressure may be a cumulative value of absolute values or scalar quantities of the values of atmospheric pressure change. The required interval may be set to a time. The required interval may be set to a detection frequency in a device that periodically detects a value.

The control program 9A may ignore the moving state based on the value of acceleration and determine the moving state based on the value of atmospheric pressure when the value of atmospheric pressure satisfies a predetermined condition. When the moving state is determined apart from determining the moving state based on the value of acceleration, the control program 9A may determine the moving state based on the value of atmospheric pressure with reference to the value of acceleration.

On the basis of knowledge of the inventors that a natural change of atmospheric pressure is slower than a change of atmospheric pressure by movement with altitude change, the above-mentioned control program 9A determines the moving state depending on whether the change of atmospheric pressure is greater than a threshold value. The above-mentioned control program 9A can determine the moving state based on the change in the value of atmospheric pressure, not based on the altitude of a user.

The atmospheric pressure data 9B includes data of the values of atmospheric pressure acquired by the atmospheric pressure sensor 19. The atmospheric pressure data 9B may include all measurement results measured by the atmospheric pressure sensor 19. The acceleration data 9C includes the values of acceleration acquired by the acceleration sensor 15. The acceleration data 9C includes a direction of the acceleration acquired by the acceleration sensor 15. The acceleration data 9C may include all measurement results measured by the acceleration sensor 15. The movement determination data 9D includes for example information of determination conditions which are used to determine a moving state of a user of the smartphone 1. The information of determination conditions may include a direction and a magnitude of acceleration acting on the smartphone 1, an acceleration pattern including time-series change of the direction and the magnitude of the acceleration, a combined vector of acceleration vectors of three axes of an X axis, a Y axis, and a Z axis, an atmospheric pressure threshold value which is used to determine the value of atmospheric pressure changed per an unit interval which acts on the smartphone 1, and a time threshold value which is used to determine a period in which the value of atmospheric pressure changed per an unit interval which acts on the smartphone 1 is equal to or greater than the atmospheric pressure threshold value. The atmospheric pressure threshold value corresponds to, for example, an amount of change in which the value of atmospheric pressure naturally changes. The time threshold value corresponds to, for example, a required time in an elevator or an escalator. The time threshold value may be set based on a longest required time in an elevator or an escalator. The time threshold value may be set based on a deviation value of the required time. The determination result data 9E includes data of determination results of the moving state. The setting data 9Z includes a variety of setting information on the operation of the smartphone 1.

The controller 10 includes an operation processor. Examples of the operation processor include a central processing unit (CPU), a system-on-a-chip (SoC), a micro control unit (MCU), a field-programmable gate array (FPGA), and a coprocessor, but are not limited thereto. The controller 10 can integrally control the operation of the smartphone 1 to implement various functions. The controller 10 is an example of a controller.

Specifically, the controller 10 can execute commands included in the programs stored in the storage 9 while referring to the data stored in the storage 9 as necessary. The controller 10 controls functional modules based on the data and the commands to implement various functions by controlling the functional modules. Examples of the functional modules include at least one of the display 2A, the communicator 6, the microphone 8, and the speaker 11, but are not limited thereto. The controller 10 may change the control based on detection results of a detection module. Examples of the detection module include at least one of the touch screen 2B, the button 3, the illumination sensor 4, the proximity sensor 5, the microphone 8, the camera 12, the camera 13, the acceleration sensor 15, the direction sensor 16, and the atmospheric pressure sensor 19, but are not limited thereto.

The speaker 11 includes a sound output module. The speaker 11 outputs a sound signal transmitted from the controller 10 as sound. The speaker 11 may output, for example, a ringtone and music sound. One of the receiver 7 and the speaker 11 may have a function of the other.

The camera 12 and the camera 13 can convert a captured image into electrical signals. The camera 12 may be a front side camera that captures an image of an object facing the display 2A. The camera 13 is a rear side camera that captures an image of an object facing the opposite surface of the display 2A. The camera 12 and the camera 13 may be mounted on the smartphone 1 in a state in which both cameras are functionally and physically unified as a camera unit which can be switched between a front side camera and a rear side camera.

The connector 14 is a terminal to which another device is connected. The connector 14 may be a general-purpose terminal such as a universal serial bus (USB), a high-definition multimedia interface (HDMI) (registered trademark), a light peak (Thunderbolt (registered trademark)), or an earphone/microphone connector. The connector 14 may be a dedicated terminal such as a dock connector. Examples of a device connected to the connector 14 include an external storage, a speaker, and a communication device, but are not limited thereto.

The acceleration sensor 15 can detect a direction and a magnitude of acceleration acting on the smartphone 1. The acceleration sensor 15 is an example of an acceleration sensor. The direction sensor 16 can detect a geomagnetic direction and measure the direction (orientation) of the smartphone 1 based on the geomagnetic direction. The gyroscope 17 can detect an angular velocity and acceleration of the smartphone 1. The magnetic sensor 18 detects a magnetic force around the smartphone 1. The control program 9A may use a detection result of any one of the acceleration sensor 15, the direction sensor 16, and the gyroscope 17 to determine the moving state. The control program 9A may use the measurement result of any one of the acceleration sensor 15, the direction sensor 16, and the gyroscope 17 to determine the type of movement.

The atmospheric pressure sensor 17 can measure the atmospheric pressure acting on the smartphone 1. The atmospheric pressure sensor 17 is an example of an atmospheric pressure sensor. The atmospheric pressure sensor 17 outputs the measured value of atmospheric pressure to the controller 10.

The smartphone 1 may include a GPS receiver and a vibrator in addition to the above-mentioned functional modules. The GPS receiver can receive radio signals of a predetermined frequency band from GPS satellites. The GPS receiver decodes the received radio signals and sends the processed signal to the controller 10. The GPS receiver supports a process of calculating a current position of the smartphone 1. The vibrator causes a part or all parts of the smartphone 1 to vibrate. The vibrator includes, for example, a piezoelectric element or an eccentric motor to generate vibrations. The smartphone 1 has functional modules such as batteries that are naturally used to maintain the functions of the smartphone 1 and a controller that is naturally used to implement the control of the smartphone 1, which are mounted thereon.

Figure 2:
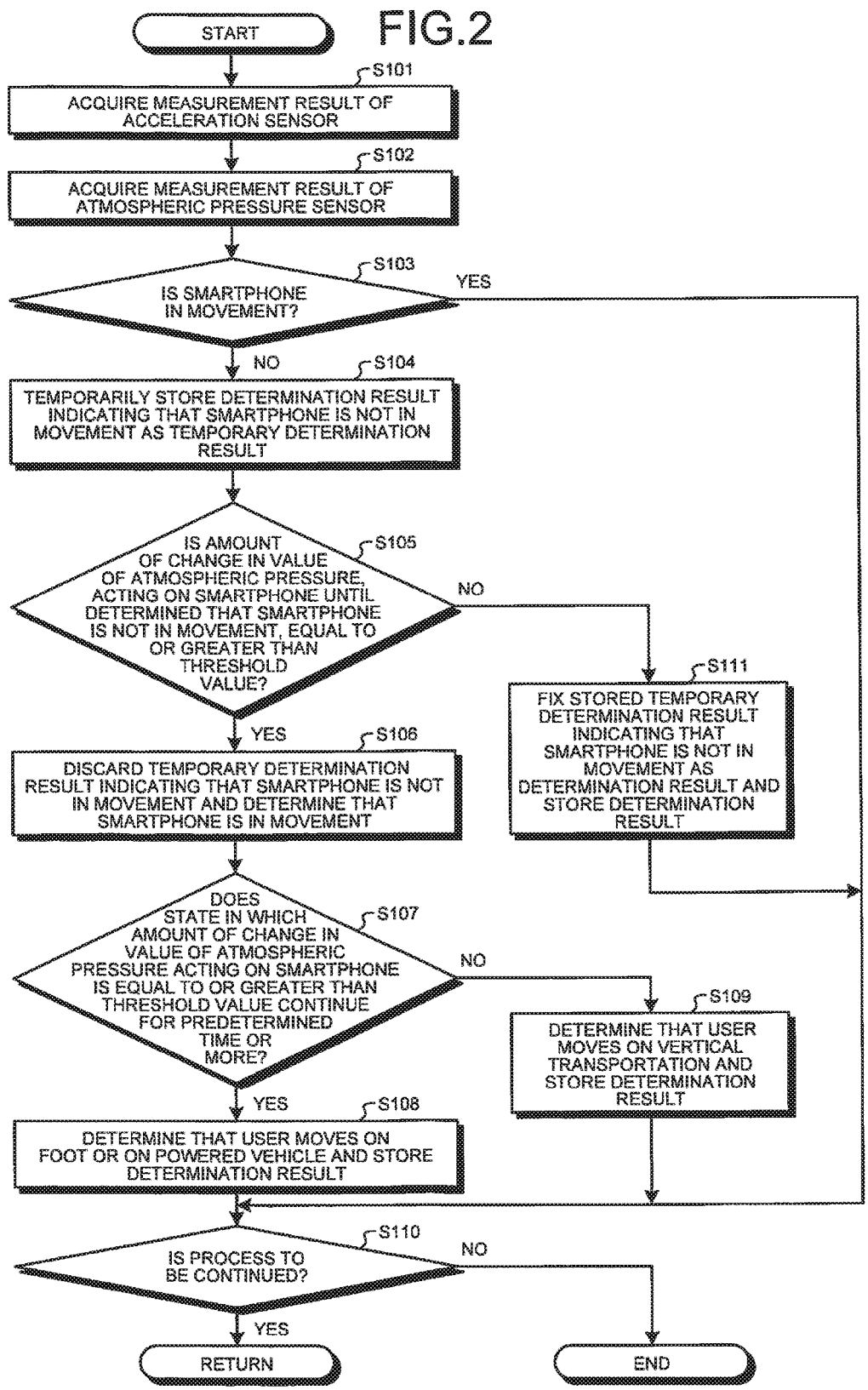
FIG. 2 is a flowchart illustrating a process flow in a smartphone according to an embodiment.

A process flow performed by the smartphone 1 according to embodiments will be described below with reference to FIG. 2. FIG. 2 is a flowchart illustrating an example of a process flow in a smartphone according to one of embodiments. The process flow illustrated in FIG. 2 is implemented by causing the controller 10 to execute the control program 9A stored in the storage 9.

As illustrated in FIG. 2, the controller 10 acquires a measurement result of the acceleration sensor 15 (Step S101).

Subsequently, the controller 10 acquires a measurement result of the atmospheric pressure sensor 19 (Step S102). Step S102 may be performed in parallel with Step S101.

Subsequently, the controller 10 determines a moving state based on the measurement result of the acceleration sensor 15 (Step S103). Step S103 may be performed in parallel with Step S102. Step S103 may be performed before Step S102.

When it is determined that the smartphone is not in movement (No at Step S103), the controller 10 temporarily stores the determination result indicating that the smartphone is not in movement as a temporary determination result (Step S104).

Subsequently, the controller 10 determines whether an amount of change in the value of atmospheric pressure, acting on the smartphone 1 until it is determined that the smartphone is not in movement, is equal to or greater than a threshold value (Step S105) based on the value of atmospheric pressure acquired at Step S102.

When it is determined that the amount of change in the value of atmospheric pressure per an unit interval acting on the smartphone 1 is equal to or greater than the threshold value (Yes at Step S105), the controller 10 discards the temporary determination result indicating that the smartphone is not in movement stored at Step S104 and determines that the smartphone is in movement (Step S106). Step S106 may be skipped.

Subsequently, the controller 10 determines whether a state in which the amount of change in the value of atmospheric pressure acting on the smartphone 1 is equal to or greater than the threshold value continues for a predetermined time or more (Step S107). For example, the controller 10 determines whether a change in atmospheric pressure greater than a threshold value for a change in atmospheric pressure continues for a time which is longer than a threshold value for a time which is set based on a required time for being in an escalator or an elevator.

When it is determined that the state in which the amount of change in the value of atmospheric pressure per an unit interval acting on the smartphone 1 is equal to or greater than the threshold value continues for the predetermined time or more (Yes at Step S107), the controller 10 determines that the user moves on foot or on powered vehicle and stores the determination result in the storage 9 as the determination result data 9E (Step S108).

On the other hand, when it is determined that the state in which the amount of change in the value of atmospheric pressure per an unit interval acting on the smartphone 1 is equal to or greater than the threshold value does not continue for the predetermined time or more (No at Step S107), the controller 10 determines that the user moves on a vertical transportation and stores the determination result in the storage 9 as the determination result data 9E (Step S109).

Subsequently, the controller 10 determines whether the process flow should be continued (Step S110). When it is determined that the process flow should be continued (Yes at Step S110), the controller 10 returns the process flow to Step S101. On the other hand, when it is determined that the process flow should not be continued (No at Step S110), the controller 10 ends the process flow illustrated in FIG. 2.

When it is determined at Step S105 that the amount of change in the value of atmospheric pressure acting on the smartphone 1 is not equal to nor greater than the threshold value (No at Step S105), the controller 10 fixes the temporary determination result indicating that the smartphone is not in movement, which is stored at Step S104, stores the determination result in the storage 9 as the determination result data 9E (Step S111), and moves the process flow to Step S110.

When it is determined at Step S103 that the smartphone is in movement (Yes at Step S103), the controller 10 moves the process flow to Step S110.

In the process flow illustrated in FIG. 2, the controller 10 may subsequently determine a type of movement when it is determined at Step S103 that the smartphone is in movement.

In the process flow illustrated in FIG. 2, when it is determined at Step S108 that the user moves on a powered vehicle, the controller 10 may determine the type of the vehicle based on the measurement result of the magnetic sensor 18. In some embodiments, the controller 10 may determine whether the type of the vehicle is an electric train based on the measurement result of the magnetic sensor 18.

In the process flow illustrated in FIG. 2, when it is determined at Step S109 that the user moves on a vertical transportation, the controller 10 may determine the type of the vehicle based on the measurement result of the atmospheric pressure sensor 19. In some embodiments, the controller 10 may determine whether the type of the vehicle is an electric train based on the measurement result of the acceleration sensor 15.

As described above, the smartphone 1 determines the moving state by evaluating vibrations of the own device based on the measurement result of the acceleration sensor 15. As in the process flow illustrated in FIG. 2, even when it is determined that the smartphone is not in movement based on the measurement result of the acceleration sensor 15, the controller 10 can determine the moving state even in a case of small vibrations, by evaluating the atmospheric pressure acting on the smartphone 1.

The smartphone 1 can determine whether the smartphone moves on an electric train or an automobile or moves on an elevator or an escalator, for example, by determining whether atmospheric pressure change which is equal to or greater than natural change of the atmospheric pressure continues for a predetermined time or more. In general, movement on an electric train or an automobile continues for a time longer than that of movement on an elevator or an escalator. It is possible to determine a type of movement by evaluating a time in which the change of the atmospheric pressure equal to or greater than the natural change of the atmospheric pressure continuously acts on the smartphone 1.

Regardless of the example of the process flow illustrated in FIG. 2, the controller 10 may perform the processes of determining the moving state and the type of movement by evaluating only the change of the value of atmospheric pressure acting on the smartphone 1.

The control program 9A can provide a function of determining that the smartphone moves on an electric train or an automobile when the change of the value of atmospheric pressure satisfies a predetermined condition. The control program 9A provides a function of determining whether the change of the atmospheric pressure equal to or greater than the natural change of the atmospheric pressure continues for a predetermined time or more as the predetermined condition.

By executing the control program 9A, the controller 10 realizes a process of determining that the user moves on foot or on a powered vehicle when the change of the value of atmospheric pressure satisfies a predetermined condition.

Figure 3:
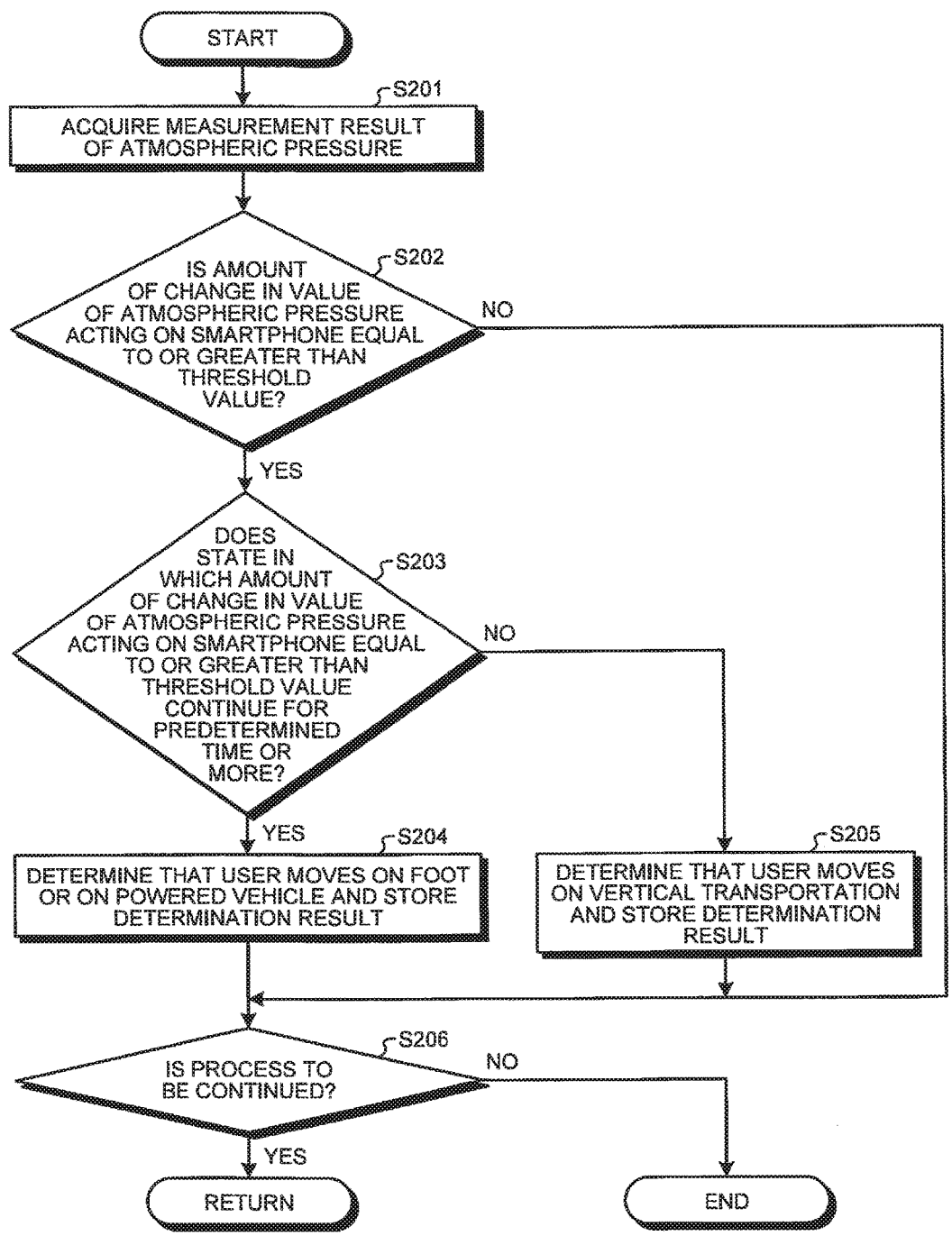
FIG. 3 is a flowchart illustrating a process flow of a smartphone according to another embodiment.

FIG. 3 is a flowchart illustrating an example of a process flow in a smartphone according to other embodiments. The process flow illustrated in FIG. 3 is embodied by causing the controller 10 to execute the control program 9A stored in the storage 9.

As illustrated in FIG. 3, the controller 10 acquires the measurement result of the atmospheric pressure sensor 19 (Step S201).

Subsequently, the controller 10 determines whether the amount of change in the value of atmospheric pressure acting on the smartphone 1 is equal to or greater than a threshold value (Step S202).

When it is determined that the amount of change in the value of atmospheric pressure acting on the smartphone 1 is equal to or greater than the threshold value (Yes at Step S202), the controller 10 determines whether a state in which the amount of change in the value of atmospheric pressure per an unit interval acting on the smartphone 1 is equal to or greater than the threshold value continues for a predetermined time or more (Step S203).

When it is determined that the state in which the amount of change in the value of atmospheric pressure acting on the smartphone 1 is equal to or greater than the threshold value continues for the predetermined time or more (Yes at Step S203), the controller 10 determines that the user moves on foot or on a powered vehicle and stores the determination result in the storage 9 as the determination result data 9E (Step S204).

On the other hand, when it is determined that the state in which the amount of change in the value of atmospheric pressure acting on the smartphone 1 is equal to or greater than the threshold value does not continue for the predetermined time or more (No at Step S203), the controller 10 determines that the user moves on a vertical transportation and stores the determination result in the storage 9 as the determination result data 9E (Step S205).

Subsequently, the controller 10 determines whether the process flow should be continued (Step S206). When it is determined that the process flow should be continued (Yes at Step S206), the controller 10 returns the process flow to Step S201. On the other hand, when it is determined that the process flow should not be continued (No at Step S206), the controller 10 ends the process flow illustrated in FIG. 3.

When it is determined at Step S202 that the amount of change in the value of atmospheric pressure per an unit interval acting on the smartphone 1 is not equal to or greater than the threshold value (No at Step S202), the controller 10 moves the process flow to Step S206.

The smartphone 1 can determine whether the user moves on foot or on a powered vehicle, or moves on a vertical transportation, by determining whether the change of atmospheric pressure equal to or greater than the natural change of atmospheric pressure variation continues for a predetermined time or more. For example, when it is directly determined whether the user moves on foot or on a powered vehicle or moves on a vertical transportation, the smartphone 1 can perform the process flow based on only the measurement result of the atmospheric pressure sensor 19. The smartphone 1 having the above-mentioned configuration can determine the moving state even in a case of small vibrations.

The smartphone 1 can be used, for example, to improve processing accuracy of an application for recording a user's daily activities such as boarding on a vehicle or the like.

Although the art according to appended claims has been described with respect to specific embodiments for the purpose of a complete and clear disclosure, the appended claims are not to be thus limited. The claims are to be construed as embodying all modifications and alternative constructions that may occur to one skilled in the art which fairly fall within the basic teaching herein set forth.

In the above-mentioned embodiments, the control program 9A performs the determination of the moving state and the determination of the type of movement independently of each other, but embodiments of the present application are not limited to the above-mentioned embodiments. In some embodiments, the control program 9A may output the type of movement as the determination result for the moving state of being in movement.

In the above-mentioned embodiments, the control program 9A classifies the moving state and the type of movement based on the movement of the smartphone 1. Embodiments of the present application are not limited to the above-mentioned embodiments. In some embodiments, the control program 9A may classify the moving state and the type of movement based on the a user's movement. For example, an elevator and an escalator may be classified not to be in movement in consideration of a case in which a user of a smartphone takes an elevator or escalator with standing still therein.

What is claimed is:

1. A mobile device, comprising:
an atmospheric pressure sensor configured to acquire a value of atmospheric pressure acting on the mobile device;
an acceleration sensor configured to acquire a value of acceleration acting on the mobile device; and
at least one controller configured to determine a moving state of the mobile device based on the value of atmospheric pressure and the value of acceleration,
wherein the at least one controller is configured to
determine the moving state of the mobile device based on the value of acceleration,
in response to determining that the mobile device is not in movement based on the value of acceleration, store a temporary determination result indicating that the mobile device is not in movement,
determine whether the value of atmospheric pressure changed per unit interval is equal to or greater than a threshold value, and
in response to determining that the value of atmospheric pressure changed per unit interval is equal to or greater than the threshold value,
discard the stored temporary determination result indicating that the mobile device is not in movement, and
determine that the mobile device is in movement and further determine a type of movement of the mobile device as one of movement on foot, movement on a man-powered vehicle, movement on a powered vehicle, and movement on a vertical transportation, and
wherein the at least one controller is configured to determine that the type of movement of the mobile device is movement on a train or an automobile, in response to determining that
the value of atmospheric pressure changed per unit interval is equal to or greater than the threshold value, and
a state in which the value of atmospheric pressure changed per unit interval is equal to or greater than the threshold value continues for a predetermined time or more.

2. The mobile device according to claim 1, further comprising:
a magnetic sensor configured to detect a magnetic force around the mobile device, wherein
the at least one controller is configured to
in response to determining that the state in which the value of atmospheric pressure changed per unit interval is equal to or greater than the threshold continues for the predetermined time or more,
determine that the type of movement of the mobile device is movement on a powered vehicle, and
determine a type of the powered vehicle based on measurement results of the magnetic sensor in response to determining that the mobile device is moving on the powered vehicle, and
in response to determining that the state in which the value of atmospheric pressure changed per unit interval is equal to or greater than the threshold does not continue for the predetermined time,
determine that the type of movement of the mobile device is movement on a vertical transportation, and
determine a type of the vertical transportation based on measurement results of the atmospheric pressure sensor and of the acceleration sensor in response to determining that the mobile device is moving on the vertical transportation.

3. A control method which is performed by a mobile device including an atmospheric pressure sensor configured to acquire a value of atmospheric pressure acting on the mobile device and an acceleration sensor configured to acquire a value of acceleration acting on the mobile device, the control method comprising:
determining a moving state of the mobile device based on the value of acceleration;
in response to determining that the mobile device is not in movement based on the value of acceleration, storing a temporary determination result indicating that the mobile device is not in movement;
determining whether the value of atmospheric pressure changed per unit interval is equal to or greater than a threshold value; and
in response to determining that the value of atmospheric pressure changed per unit interval is equal to or greater than the threshold value,
discarding the stored temporary determination result indicating that the mobile device is not in movement, and
determining that the mobile device is in movement and further determining a type of movement of the mobile device as one of movement on foot, movement on a man-powered vehicle, movement on a powered vehicle, and movement on a vertical transportation,
wherein the type of movement of the mobile device is determined as movement on a train or an automobile, in response to determining that
the value of atmospheric pressure changed per unit interval is equal to or greater than the threshold value, and
a state in which the value of atmospheric pressure changed per unit interval is equal to or greater than the threshold value continues for a predetermined time or more.

* * * * *